(No Model.)
H. C. HILL.
SULKY.
No. 429,348. Patented June 3, 1890.
Fig. 1.
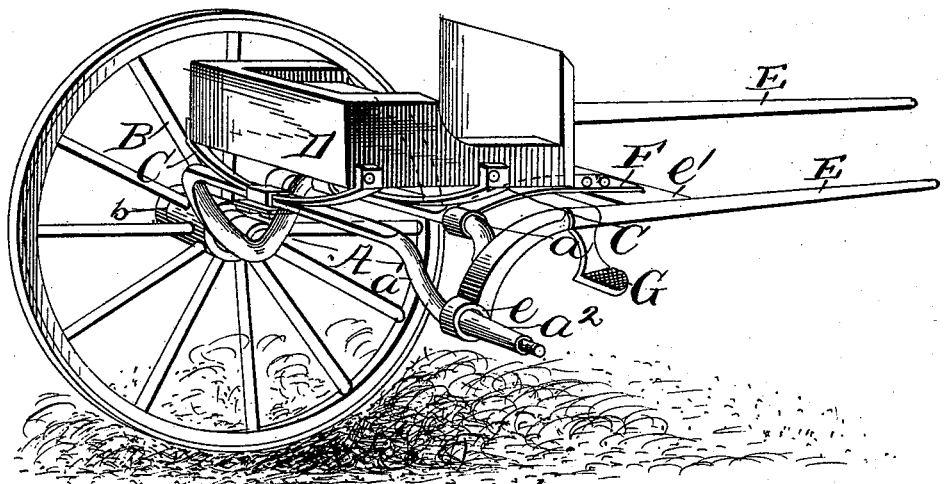
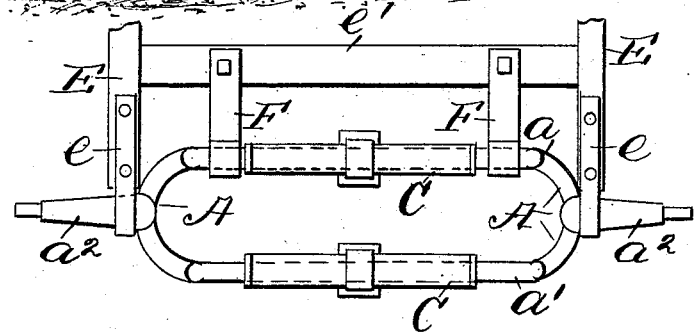
Fig. 2.
Witnesses
Inventor
Homer C. Hill
by L. S. Whitman
Attorney

UNITED STATES PATENT OFFICE.

HOMER C. HILL, OF CLINTON, ILLINOIS.

SULKY.

SPECIFICATION forming part of Letters Patent No. 429,348, dated June 3, 1890.

Application filed October 31, 1889. Serial No. 328,750. (No model.)

*To all whom it may concern:*

Be it known that I, HOMER C. HILL, a citizen of the United States, residing at Clinton, in the county of DeWitt and State of Illinois, have invented certain new and useful Improvements in Sulkies; and I do hereby declare the following to be a full, clear, and exact description of the invention, such as will enable others skilled in the art to which it appertains to make and use the same.

My invention relates to certain new and useful improvements in sulkies; and it consists in providing the axle thereof with a bifurcated central portion, upon which the seat of the vehicle is supported by means of springs, the shafts of the vehicle being rotatably attached to the ends of the axle, but limited and regulated in their movement by springs attached thereto and to the forward fork of the axle, as will be hereinafter more fully described and claimed.

Referring to the accompanying drawings, in which similar parts are designated by similar letters, Figure 1 is a perspective view of my invention. Fig. 2 is a plan view thereof with the seat removed.

The axle A is bifurcated at its central portion and has front and rear forks $a$ and $a'$, respectively, while the ends $a^2$ thereof are rounded, as is usual, and receive the hubs $b$ of the wheels B. Springs C C rest upon the forks $a$ and $a'$ of the axle and carry the seat D of the vehicle.

The shafts E have straps $e$ of metal on their rear ends, the said straps loosely encircling the rounded ends $a^2$ of the axle inside of the wheels, thus permitting the shafts to swing in a vertical plane therearound.

Springs F have their rear ends loosely encircling the front fork $a$ of the axle and their forward ends attached to the cross-piece $e'$ of the shafts E, while steps G of any well-known form may be attached to the latter.

In the use of my invention it will be observed that the shafts E will be supported at a fixed height by the horse harnessed therein, and that the axle carrying the seat will be prevented from completely turning in the straps $e$ of the shafts by means of the springs F, which will at the same time give slightly, permitting a limited movement and preventing the motion of the horse from being transferred directly to the seat, to the discomfort of the driver.

Having thus described my invention, what I claim, and desire to secure by Letters Patent of the United States, is—

1. In a sulky, the combination of an axle having a bifurcated central portion forming front and rear forks and rounded ends, shafts rotatably attached to the ends thereof, and springs, one end of each of the said springs being connected to the shafts and the other end to the forward fork of the axle, as and for the purposes described.

2. In a sulky, the combination of an axle having a bifurcated central portion forming front and rear forks and rounded ends, shafts rotatably attached to the said rounded ends, springs, one end of each of the said springs being rotatably attached to the forward fork of the axle and the other end to the shafts, a seat, and springs mounted on the front and rear forks and carrying the said seat, as and for the purposes described.

In testimony whereof I affix my signature in presence of two witnesses.

HOMER C. HILL.

Witnesses:
W. M. CARTER,
CHARLES McCUDDY.